United States Patent
Kumar

(10) Patent No.: US 7,315,854 B2
(45) Date of Patent: Jan. 1, 2008

(54) DISTRIBUTED DIRECTORY REPLICATION

(75) Inventor: Apurva Kumar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 10/972,740

(22) Filed: Oct. 25, 2004

(65) Prior Publication Data

US 2006/0089925 A1     Apr. 27, 2006

(51) Int. Cl.
G06F 7/00     (2006.01)
G06F 15/16     (2006.01)

(52) U.S. Cl. .................... 707/3; 707/10; 707/101; 709/217; 709/219

(58) Field of Classification Search ........ 707/100–102, 707/3, 4, 10; 709/223, 233, 226
See application file for complete search history.

(56) References Cited

U.S. PATENT DOCUMENTS

| | | | |
|---|---|---|---|
| 6,154,776 A * | 11/2000 | Martin ........................ 709/226 |
| 6,347,314 B1 * | 2/2002 | Chidlovskii ..................... 707/3 |
| 6,408,306 B1 | 6/2002 | Byrne et al. |
| 6,490,589 B1 | 12/2002 | Weider et al. |
| 6,647,393 B1 * | 11/2003 | Dietterich et al. .......... 707/102 |
| 6,708,170 B1 * | 3/2004 | Byrne et al. .................... 707/9 |
| 6,845,383 B1 * | 1/2005 | Kraenzel et al. ............ 707/200 |
| 6,904,433 B2 * | 6/2005 | Kapitskaia et al. ............. 707/1 |
| 2002/0059519 A1 * | 5/2002 | Yamagishi et al. ......... 713/175 |
| 2002/0174225 A1 * | 11/2002 | Smith et al. ................. 709/226 |
| 2003/0078937 A1 * | 4/2003 | Boreham et al. ........... 707/102 |
| 2003/0172145 A1 * | 9/2003 | Nguyen ....................... 709/223 |
| 2003/0191781 A1 * | 10/2003 | Civanlar et al. ............ 707/200 |
| 2003/0208478 A1 * | 11/2003 | Harvey ........................... 707/3 |
| 2004/0059719 A1 * | 3/2004 | Gupta et al. .................... 707/3 |
| 2004/0078368 A1 * | 4/2004 | Excoffier et al. ................ 707/4 |
| 2005/0102297 A1 * | 5/2005 | Lloyd et al. ................. 707/100 |
| 2006/0173873 A1 * | 8/2006 | Prompt et al. .............. 707/100 |

OTHER PUBLICATIONS

Jen Moller—"Directory Replication"—The Colomar Group, Inc., 1997 (pp. 1-8).*
Henning Maab—"Location-Aware Mobile Applications based on Directory Services"—MOBICOM 97 Budapest Hungary 1997 (pp. 23-33).*
"The String Representation of LDAP Search Filters"—IETS, Network Working Group: request for comments (rfc): 2254, Dec. 1997, www.ictf.org/rfc/rfc2254txt.*
"Technical Overview of Directory Services Using X.500 Protocol"—IETS, Network Working Group: request for comments (rfc): 1309, Mar. 1992, http://tools.ietf.org/html/rfc1309.*
"Formal Analysis of the Lightweight Directory Access Protocol"—Fang Wei & Georg Lausen ER 2001 Workshops, LNCS 2465, pp. 306-319-2002—www.springerlinl.com Berlin Heidelberg 2002.*

(Continued)

*Primary Examiner*—Shahid Alam
*Assistant Examiner*—Anh Ly
(74) *Attorney, Agent, or Firm*—Gibb & Rahman, LLC

(57) ABSTRACT

A replication model has replicas store selected entries from subtrees. Only entries satisfying a particular search criterion specified by a filter are stored. Query containment is used to determine whether the query can be answered locally, or a referral to a remote server is required.

20 Claims, 3 Drawing Sheets

OTHER PUBLICATIONS

International Telecommunications Union, ITU-T Recommendation X.525, "Information technology—Open Systems Interconnection—The Directory: Replication", Feb. 2001, 43 pages.
The Internet Engineering Task Force, Network Working Group, Request for Comments: 3377, "Lightweight Directory Access Protocol (v3): Technical Specification", Sep. 2002 [http://www.ietf.org/rfc/rfc3377.txt], 5 pages.
The Internet Engineering Task Force, Network Working Group, Request for Comments: 2251, "Lightweight Directory Access Protocol (v3)", Dec. 1997 [http://www.ietf.org/rfc2251.txt], 47 pages.
The Internet Engineering Task Force, Network Working Group, Request for Comments: 3296, "Named Subordinate References in Lightweight Directory Access Protocol (LDAP) Directories", Jul. 2002 [http://www.ietf.org/rfc/rfc3296.txt], 14 pages.

* cited by examiner

DISTRIBUTED DIRECTORY REPLICATION

FIELD OF THE INVENTION

The present invention relates to distributed directory replication in the context of processing search queries.

BACKGROUND

Directories are specialized databases that are used for storing information about heterogeneous real world entities: users, network elements, services, policies etc. Directories are especially important in enterprises where a single enterprise directory contains central information (for example, concerning organizational administration) and provides integration of multiple intranet applications. Directories are also used in portals for storing user information (such as profiles/preferences) and for authenticating the users. Directories are typically used as foundational pieces in the identity management framework of an enterprise.

Large directories may contain as many as tens of millions of entries (records) arranged in a Directory Information Tree (DIT). Such directories typically need to be distributed across multiple directory servers. Directories are accessed on the internet using LDAP (Lightweight Directory Access Protocol). Moreover directory access (read/write) rate is in general proportional to the number of users (that is, the size of the directory). Also users of such directories are distributed globally.

Two techniques are used for improving performance of globally-accessed large directories: partitioning and replication. Partitioning refers to a directory being distributed across multiple servers. This might be required if the directory is too large to support on a single server. Replication is a technique to improve performance scalability, and reliability of the directory service by having additional replica servers, which are synchronized with the master servers. Current large-scale directory deployment provides partitioning or replication using a subtree of entries. Replica servers can be installed local to a site to improve performance, or can be used in a replica array to improve scalability and reliability. When replication is used with partitioning a (partial) replica contains one or more subtrees of entries from the DIT.

While such replication models can be used to improve performance of directories that can be supported by a single server, such models do not handle queries that span multiple subtrees very well.

For example, a partial replica close to the client can only answer a part of the query and refer the rest of the query to remote servers. Using referrals to contact remote server(s) degrades performance. Also, the only way to contain directory queries in fewer servers is to have replicas with larger subtrees. Further, replicating larger subtrees results in larger update traffic. This requires network bandwidth and results in increased update load on the replica servers.

LDAP is documented by the Internet Engineering Task Force in RFC 3377, which is entitled "Lightweight Directory Access Protocol (v3): Technical Specification", the complete disclosure of which is herein incorporated by reference. LDAP does not standardize directory replication. Replication for X.500 directories, by contrast, is described in the X.525 recommendation of the International Telecommunications Union, published as ITU-T Recommendation X.525, the complete disclosure of which is herein incorporated by reference.

Accordingly, in view of the above observations, there exists a need for an improved manner of distributed directory replication.

SUMMARY

A replication model is described herein, which improves performance of large distributed directories that receive directory search queries. The model described herein differs from existing replication models in the following aspects:
(i) Replicas store only selected entries from subtrees (replication context).
(ii) Replication subtrees/contexts can span across multiple servers.
(iii) Whether a query can be answered by the replicated context is determined using query containment rules.
(iv) Mechanism used for synchronizing replicas sends updates in the replication context and not the entire subtree.

Query containment, as described herein in further detail, has various advantages. Selectively replicating entries in a subtree allows the scope of replication to be increased to larger subtrees. Also, since the update traffic is proportional to the number of replicated entries, restricting the number of entries reduces update traffic. Further, since (selected entries from) larger subtrees are replicated, queries are more likely to be scoped within a server, rather than requiring communication with a different server.

DETAILED DESCRIPTION

Figure 1A:
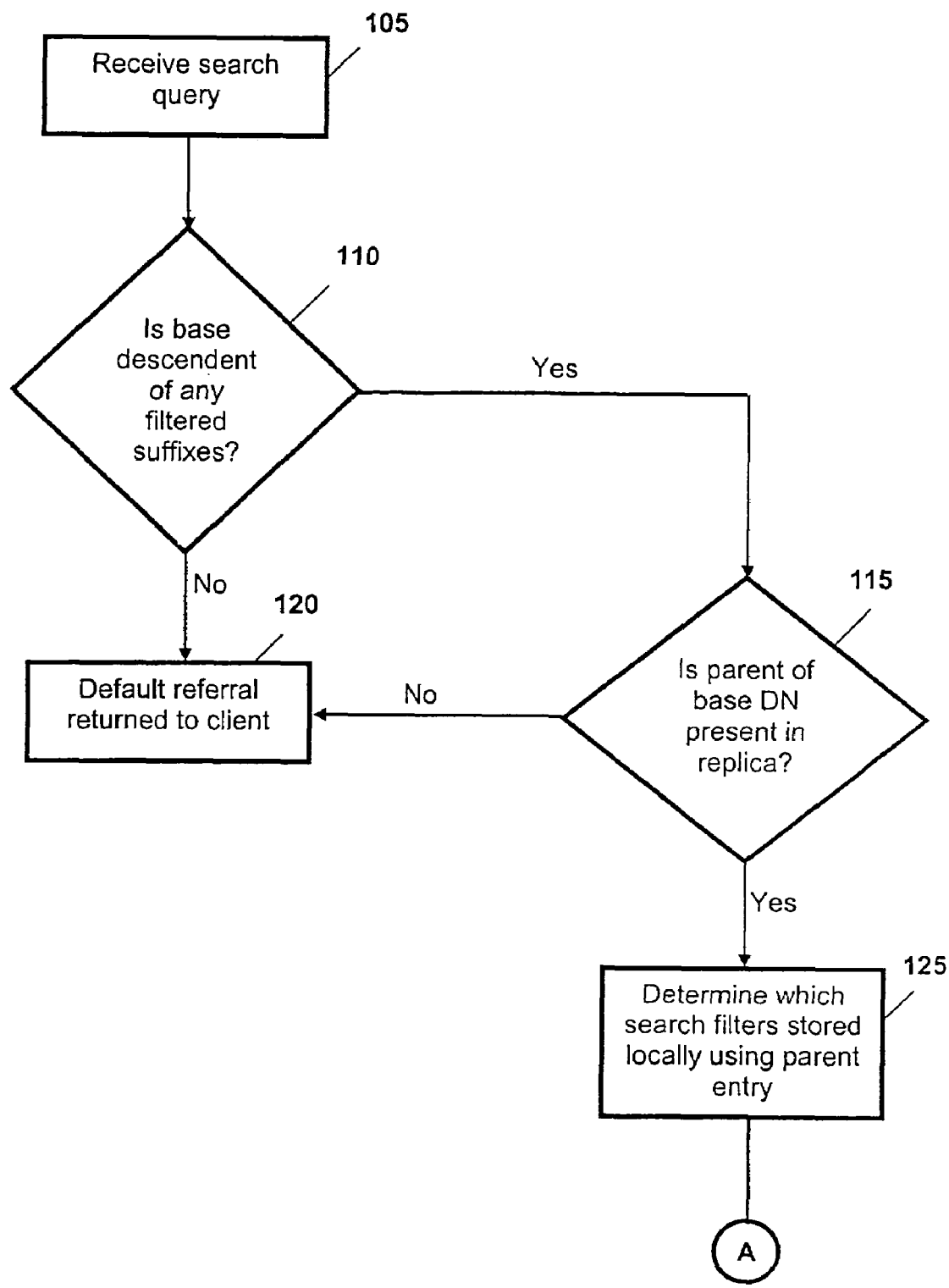
FIGS. 1A and 1B form a flow chart of steps involved in the distributed directory replication technique described herein.
Figure 1B:
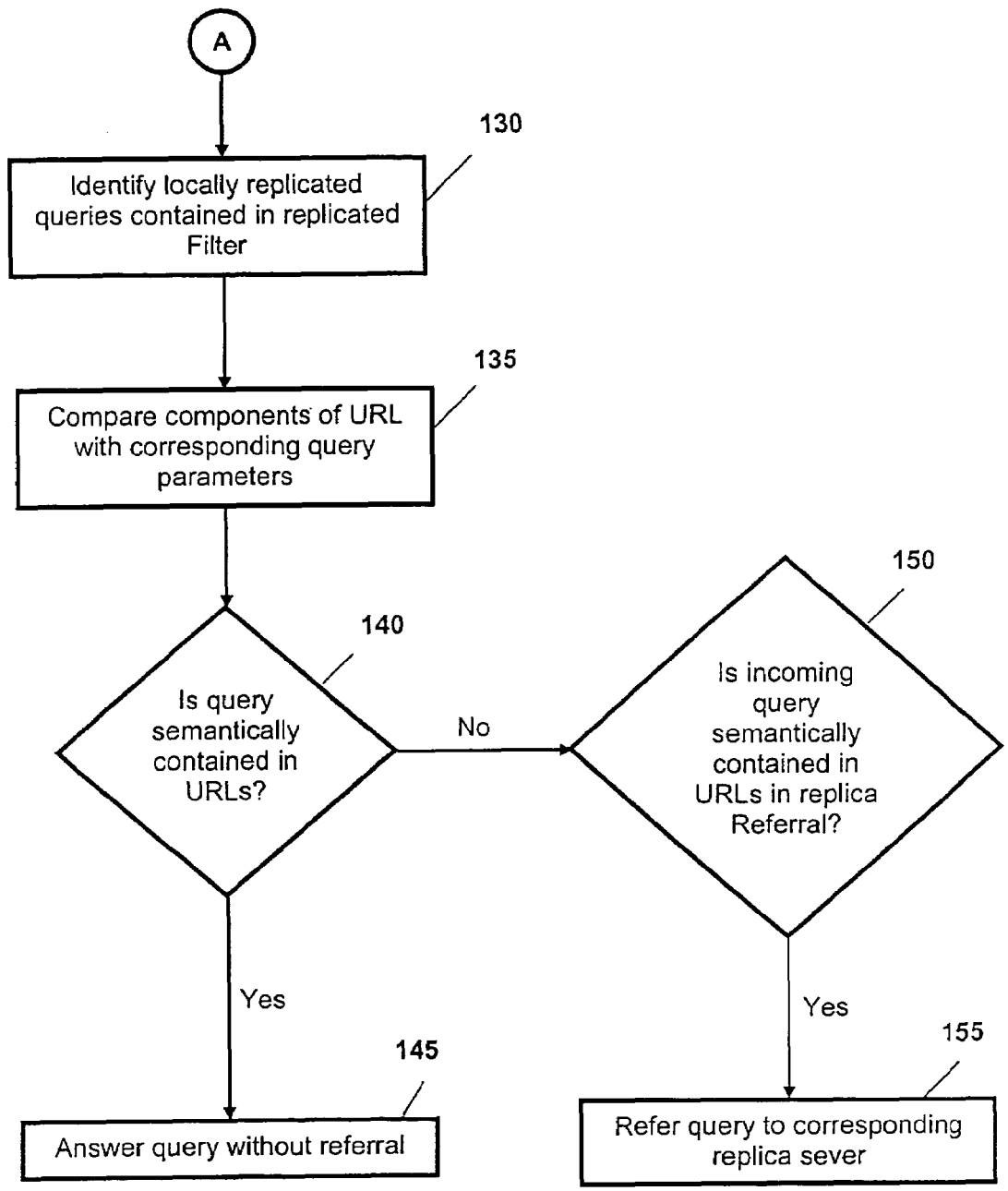

Although techniques discussed herein are applicable to directories in general, an LDAP (Lightweight Directory Access Protocol directories) based preferred embodiment of the techniques is described in detail, Further details concerning LDAP can be reviewed in *Request for Comments* 2251, the content of which is hereby incorporated by reference.

Directories contain records hierarchically arranged as a directory information tree (DIT). Each record is a collection of attribute types and their values. Each entry is identified by a unique distinguished name (DN) which is based on the hierarchical location of the entry in the DIT.

LDAP specifies the communication protocol used to access and manage directories over TCP/IP communication links. LDAP also specifies the information model used to define the directory schema, which in turn controls the type of entries (object classes), attributes and values that can be stored in the directory.

The LDAP protocol allows clients to perform operations against an LDAP server. The LDAP standard also specifies the naming, information and security models. The operations which a client can perform are: search, compare, add, delete, modify, modifyDN, bind, unbind and abandon. Directories are optimized for read access and the most important operation is the search operation. The operation parameters include a search specification, which is described in Table 1 below.

TABLE 1

| | |
|---|---|
| Base | Root entry of the search in the DIT |
| Scope | Scope of the search under root |
| | Base: Search only the base entry |
| | Single-level: Search only the children of the base entry |
| | Subtree: Search the base entry and all entries below the base entry |
| Filter | Search criterion: Boolean combination of atomic and negative atomic filters where an atomic filter is an equality, ordering or substring assertion on an attribute value |
| | Example: filters: (&(sn=Doe) (givenName=John)), (&(houseIdentifier=221B) (street=Baker)) |
| Attributes | Set of attributes required from entries satisfying the search filter |

For large directories the DIT is typically distributed across multiple servers. Each server has the knowledge of the naming contexts stored on the server. A naming context identifies a subtree with its root as the suffix of the naming context and its boundaries as zero or more referral entries pointing to other servers holding subordinated naming contexts. Each naming context is defined by a suffix and referral (if any) DNs. A suffix could be o=ibm, ou=research, o=ibm and so on. Referrals are configured as special referral entries at the boundary of the naming context.

When a search request scoped across multiple partitions is received, the server containing the base entry returns the matching entries and any continuation references to other partitions. Such a referral contains a set of LDAP URLs, the format of which is specified in the above-mentioned RFC 2251 and is reproduced below.

ldap://[hostport]?[dn]?[attributes]?[scope]?[filter]

Each URL is capable of being used by the client to progress the operation. The client application is responsible for chasing referrals and returning a complete set of results to the user.

Multiple URLs in a referral are an indication of replication in the distributed directory. The URL format for such a search continuation referral is as follows. As an example, consider the search that follows.

base="ou=research,o=ibm",scope="subtree", filter="(initials=JFK)",attributes="all"

The search is received at host A, which has a configured referral object to host B at c=us, ou=research, o=ibm. Host A returns any matching entries and the following referral.

ldap://hostB:389?c=us,ou=research,o=ibm?sub

The referral is processed by the client, by using the initial filter along with the search specification specified in the referral URL. Since referrals are required to be resolved by clients, performance of search operations that are scoped across multiple partitions consequently degrades. Hence less partitioning of the name spaces is desirable. This, however, might not be possible for large directories.

Replication Model

The replication model described herein differs from existing directory replication models, as replicating search filters and query containment are used for answering or referring queries. Read-only replica servers contain a subset of entries in a subtree. The subset corresponds to those entries that satisfy a particular search specification which defines the replication context. This allows higher-level subtrees to be contained in a replica. A replica can contain any number of such filtered subtrees. A filtered subtree is represented by a suffix and a filter. Unlike a naming context, a replication context is not bounded by referrals. The filtered subtree is equivalent to entries returned for a search operation with the suffix as its base, subtree as the scope, filters the search filter and requesting all the attributes of the entry. Similarly, the replica can contain entries corresponding to single-level search filters.

The replica DSAIT is a sparse tree and glue entries (which are described in the X.500 ITU-T Recommendation) can be used to preserve the tree structure. If a non-leaf entry is not present in the replica, this entry is represented as a glue entry which does not contain any use attributes. Each entry in the referral tree (including glue entries) is augmented by an auxiliary object class replicaEntry, which has two optional attributes: replicaFilter and replicaReferral. Consider the following example entry at host A in Table 2 below.

TABLE 2 dn: ou=research, o=ibm
ou: research
objectclass: top
objectclass: organizationalUnit
objectclass: replicaEntry
replicaFilter:
    ldap:///ou=people,ou=research,o=ibm??sub?(title=Research Staff Member)
replicaReferral:
    ldap://hostB/ou=people,ou=research,o=ibm??sub?(title=Technical Staff Member)
replicaReferral: ldap//hostC/ou=people,ou=research,o=ibm The interpretation of these attributes, in Table 2 above, is as follows. Each value for the attribute replicaFilter is an LDAP URL representing a replication context held locally by the server. The base and filter are specified by the search specification in the URL, which indicates the locally contained entries. In the above example of host A in Table 2 an entry satisfies the search that follows.

base="ou=people,ou=research,o=ibm",
    scope="subtree", filter="(title=Research Staff Member)",attributes=all The value could also be a single-level search filter, in which case replicaFilter has the value below.

ldap://ou=people,ou=research,o=ibm??one?(departmentNumber=12)

The attribute replicaReferral points to naming contexts or replicated filters stored in other servers. This attribute is similar to the "ref" attribute, which is described in *Request for Comments* 3296, the complete disclosure of which is herein incorporated by reference.

If both replicaReferral and replicaFilter attributes are absent, there is no filtering/referrals at that level, and all the children entries are contained by the server.

Operation Processing

The outline of processing a search operation (that is, a query) is now described. An incoming search request is received in step 105. One first determines if the base is a descendant of any of the filtered suffixes in step 110. If not, then the default referral is used to return a referral to the client in step 120. A determination is made in step 115 of whether or not the parent of the base DN is not present in the replica. If not, a default referral is generated in step 120, as with the determination of step 110.

Otherwise, the parent entry is used to determine which search filters are stored locally in step 125. The URLs contained in replicaFilter identify locally replicated queries in step 130. The "dn", "scope" and "filter" components of the URL are compared against the base, scope and filter of the incoming query in step 135.

If the incoming query is semantically contained (as determined in step 140) in any of the queries specified by the URLs, the query can be answered by the replica without generating any referrals in step 145.

Otherwise, a similar comparison between the incoming query and the URLs in the values of replicaReferral attribute is performed in step 150. If the incoming query is contained in any of the referral values, the query is referred to the corresponding replica/master server in step 155.

Semantic Containment

A query Q, is said to be "semantically contained" in another query Q', if all of the following are true:
(i) The base of Q should be the same or a descendant of the base of Q'.
(ii) The scope of Q' is subtree
   OR
   The scope of Q' is same as the scope of Q AND Q and Q' have the same base.
   OR
   The scope of Q' is single-level AND the scope of Q is base AND the base of Q is a child of the base of Q'.
(iii) The filter of Q is more restrictive than (or contained in) the filter of Q', that is, any entry satisfying the condition specified by the filter of Q also satisfies the condition specified by Q'.

Computer Hardware

Figure 2:
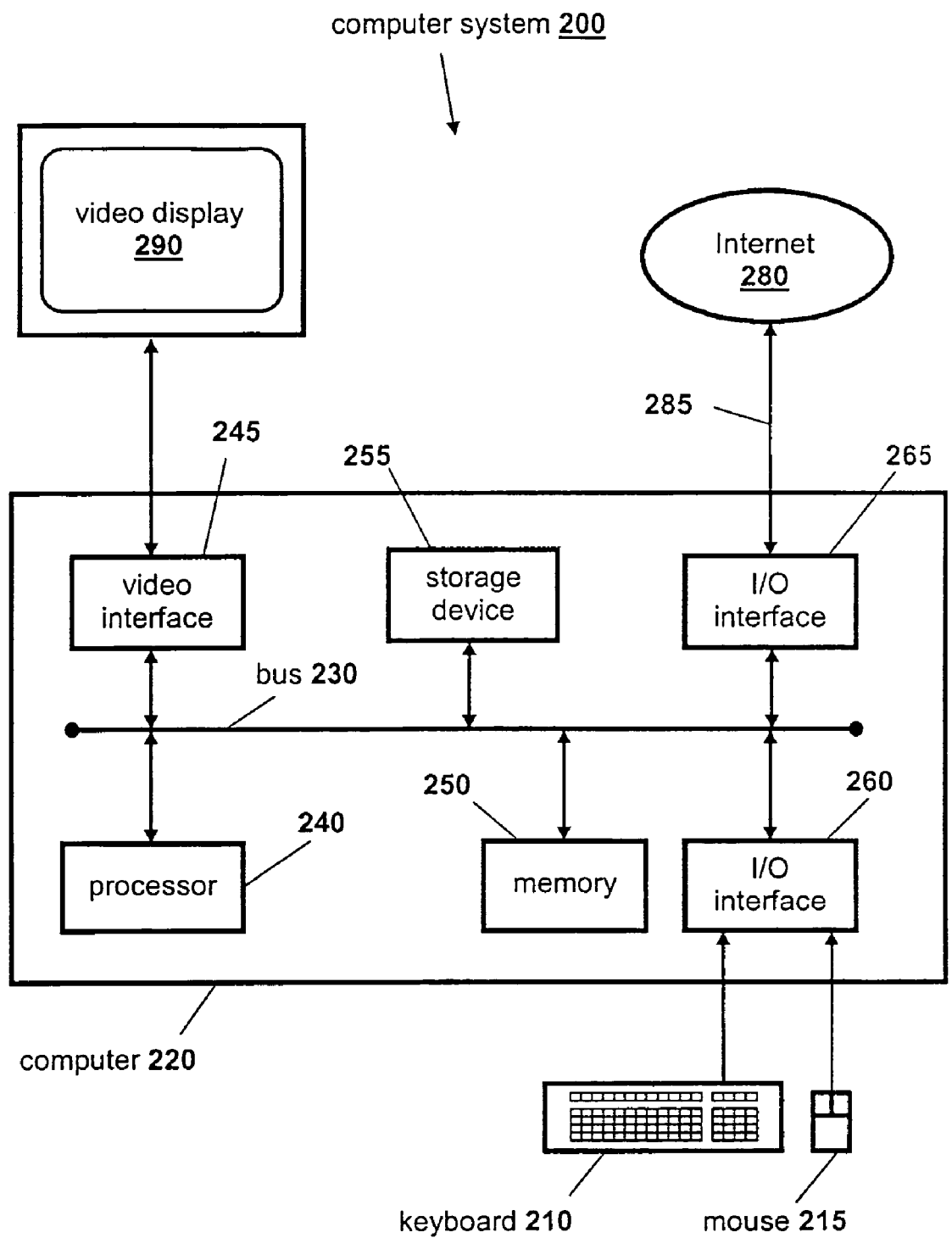
FIG. 2 is a schematic representation of a computer system suitable for performing the techniques described herein.

FIG. 2 is a schematic representation of a computer system 200 of a type that is suitable for executing computer software for participating in distributed directory replication. Computer software executes under a suitable operating system installed on the computer system 200, and may be thought of as comprising various software code means for achieving particular steps.

The components of the computer system 200 include a computer 220, a keyboard 210 and mouse 215, and a video display 290. The computer 220 includes a processor 240, a memory 250, input/output (I/O) interfaces 260, 265, a video interface 245, and a storage device 255.

The processor 240 is a central processing unit (CPU) that executes the operating system and the computer software executing under the operating system. The memory 250 includes random access memory (RAM) and read-only memory (ROM), and is used under direction of the processor 240.

The video interface 245 is connected to video display 290 and provides video signals for display on the video display 290. User input to operate the computer 220 is provided from the keyboard 210 and mouse 215. The storage device 255 can include a disk drive or any other suitable storage medium.

Each of the components of the computer 220 is connected to an internal bus 230 that includes data, address, and control buses, to allow components of the computer 220 to communicate with each other via the bus 230.

The computer system 200 can be connected to one or more other similar computers via a input/output (I/O) interface 265 using a communication channel 285 to a network, represented as the Internet 280.

The computer software may be recorded on a portable storage medium, in which case, the computer software program is accessed by the computer system 200 from the storage device 255. Alternatively, the computer software can be accessed directly from the Internet 280 by the computer 220. In either case, a user can interact with the computer system 200 using the keyboard 210 and mouse 215 to operate the programmed computer to software executing on the computer 220.

Other configurations or types of computer systems can be equally well used to execute computer software that assists in implementing the techniques described herein.

A method is provided for processing a directory search query at a replica server, said method comprising: storing a filtered replica of one or more directory entries matching one or more predetermined search specifications; determining whether or not a directory search query is semantically contained within the replicated directory entries; responding to the directory search query based upon the replicated directory entries, if the determination is affirmative; and responding to the directory search query with a referral, if the determination is negative. The method further comprises determining whether or not a directory search query can be answered by the filtered replica based upon meta-information included in a parent of a base object of the filtered replica. The method further comprises determining whether or not a directory search query can be referred to a peer replica based upon meta-information included in a parent of a base object of the filtered replica.

CONCLUSION

Various alterations and modifications can be made to the techniques and arrangements described herein, as would be apparent to one skilled in the relevant art.

We claim:

1. A method for processing a search request of a computer directory containing records hierarchically arranged as a directory information tree (DIT) at a replica server, said method comprising:
   receiving an incoming search request from a client computer;
   forming a replicated directory, said forming comprising storing a filtered replica of one or more directory entries matching one or more predetermined search specifications, wherein said filtered replica comprises a duplicate of said one or more directory entries, and wherein said search specifications comprise a base corresponding to a root entry of said search request in said DIT, a scope of said search request under said root entry, a filter corresponding to a search criterion of said search request, and attributes required from the directory entries satisfying said search criterion;
   determining whether said search request is semantically contained within said replicated directory using a query containment rule,
   such that said search request is determined to be semantically contained within the replicated directory only if a base of said search request is the same or a descendant of a base of said filtered replica, and
   such that said search request is determined to be not semantically contained within said replicated directory only if said base of said search request is one of not the same and not a descendant of said base of said filtered replica; and
   responding to said search request based on the determining process, wherein the response to said search request when said search request is semantically contained within the filtered replica comprises answering said search request based upon the filtered replica without making a referral of said search request to said replica server, and wherein the response to said search request when said search request is not contained within the filtered replica comprises referring said search request to said replica server.

2. The method of claim 1, further comprising determining whether a search request can be answered by the filtered replica based upon meta-information included in a parent of a base object of the filtered replica.

3. The method of claim 1, further comprising determining whether a search request can be referred to a peer replica based upon meta-information included in a parent of a base object of the filtered replica.

4. The method of claim 1, wherein in the storing process, the predetermined search specification comprises a search request scoped as one of a base search, a single-level search, or an entire subtree search.

5. The method of claim 1, wherein said search request is determined to be semantically contained within the replicated directory entries only if (a) a scope of said filtered replica is a subtree, or (b) said scope of said filtered replica is the same as a scope of said search request and said search request and said filtered replica have the same base, or (c) said scope of said filtered replica is a single-level and said scope of said search request is a base and said base of said search request is a child of a base of said filtered replica.

6. The method of claim 1, wherein said search request is determined to be semantically contained within the replicated directory entries only if a filter of said search request is more restrictive than a filter of said filtered replica such that any entry satisfying a condition specified by said filter of said search request also satisfies a condition specified by said filtered replica 7. The method of claim 1, wherein said search criterion comprises a Boolean combination of atomic and negative atomic filters, wherein said atomic filter comprises any of an equality, ordering, and substring assertion on an attribute value.

8. A method for processing a search request of a computer directory containing records hierarchically arranged as a directory information tree (DIT) at a replica server, said method comprising:
   receiving an incoming search request from a client computer;
   forming a replicated directory, said forming comprising storing a filtered replica of one or more directory entries matching one or more predetermined search specifications, wherein said filtered replica comprises a duplicate of said one or more directory entries, and wherein said search specifications comprise a base corresponding to a root entry of said search request in said DIT, a scope of said search request under said root entry, a filter corresponding to a search criterion of said search request, and attributes required from the directory entries satisfying said search criterion;
   determining whether said search request is semantically contained within said replicated directory using a query containment rule,
   such that said search request is determined to be semantically contained within the replicated directory only if (a) a scope of said filtered replica is a subtree, or (b) said scope of said filtered replica is the same as a scope of said search request and said search request and said filtered replica have the same base, or (c) said scope of said filtered replica is a single-level and said scope of said search request is a base and said base of said search request is a child of a base of said filtered replica, and
   such that said search request is determined to be not semantically contained within said replicated directory only if one of (a) said scope of said filtered replica is not said subtree, (b) said scope of said filtered replica is not the same as said scope of said search request and said search request and said filtered replica do not have the same base, and (c) said scope of said filtered replica is not said single-level and said scope of said search request is not said base and said base of said search request is not said child of said base of said filtered replica; and
   responding to said search request based on the determining process, wherein the response to said search request when said search request is semantically contained within the filtered replica comprises answering said search request based upon the filtered replica without making a referral of said search request to said replica server, and wherein the response to said search request when said search request is not contained within the filtered replica comprises referring said search request to said replica server.

9. The method of claim 8, further comprising determining whether a search request can be answered by the filtered replica based upon meta-information included in a parent of a base object of the filtered replica.

10. The method of claim 8, further comprising determining whether a search request can be referred to a peer replica based upon meta-information included in a parent of a base object of the filtered replica.

11. The method of claim 8, wherein in the storing process, the predetermined search specification comprises a search request scoped as one of a base search, a single-level search, or an entire subtree search.

12. The method of claim 8, wherein said search request is determined to be semantically contained within the replicated directory entries only if a base of said search request is the same or a descendant of a base of said filtered replica.

13. The method of claim 8, wherein said search request is determined to be semantically contained within the replicated directory entries only if a filter of said search request is more restrictive than a filter of said filtered replica such that any entry satisfying a condition specified by said filter of said search request also satisfies a condition specified by said filtered replica.

14. The method of claim 8, wherein said search criterion comprises a Boolean combination of atomic and negative atomic filters, wherein said atomic filter comprises any of an equality, ordering, and substring assertion on an attribute value.

15. A method for processing a search request of a computer directory containing records hierarchically arranged as a directory information tree (DIT) at a replica server, said method comprising:
   receiving an incoming search request from a client computer;
   forming a replicated directory, said forming comprising storing a filtered replica of one or more directory entries matching one or more predetermined search specifications, wherein said filtered replica comprises a duplicate of said one or more directory entries, and wherein said search specifications comprise a base corresponding to a root entry of said search request in said DIT, a scope of said search request under said root entry, a filter corresponding to a search criterion of said search request, and attributes required from the directory entries satisfying said search criterion;
   determining whether said search request is semantically contained within said replicated directory using a query containment rule, such that said search request is determined to be semantically contained within the replicated directory entries only if a filter of said search request is more restrictive than a filter of said filtered replica such that any entry satisfying a condition specified by said filter of said search request also satisfies a condition specified by said filtered replica, and such that said search request is determined to be not semantically contained within said replicated directory only if said filter of said search request is not more restrictive than said filter of said filtered replica such that any said entry satisfying said condition specified by said filter of said search request does not also satisfies said condition specified by said filtered replica; and responding to said search request based on the determining process, wherein the response to said search request when said search request is semantically contained within the filtered replica comprises answering said search request based upon the filtered replica without making a referral of said search request to said replica server, and wherein the response to said search request when said search request is not contained within the filtered replica comprises referring said search request to said replica server.

16. The method of claim 15, further comprising determining whether a search request can be answered by the filtered replica based upon meta-information included in a parent of a base object of the filtered replica.

17. The method of claim 15, further comprising determining whether a search request can be referred to a peer replica based upon meta-information included in a parent of a base object of the filtered replica.

18. The method of claim 15, wherein in the storing process, the predetermined search specification comprises a search request scoped as one of a base search, a single-level search, or an entire subtree search.

19. The method of claim 15, wherein said search request is determined to be semantically contained within the replicated directory entries only if a base of said search request is the same or a descendant of a base of said filtered replica, and wherein said search request is determined to be semantically contained within the replicated directory entries only if (a) a scope of said filtered replica is a subtree, or (b) said scope of said filtered replica is the same as a scope of said search request and said search request and said filtered replica have the same base, or (c) said scope of said filtered replica is a single-level and said scope of said search request is a base and said base of said search request is a child of a base of said filtered replica.

20. The method of claim 15, wherein said search criterion comprises a Boolean combination of atomic and negative atomic filters, wherein said atomic filter comprises any of an equality, ordering, and substring assertion on an attribute value.

* * * * *